United States Patent
Jungklaus et al.

(10) Patent No.: US 9,945,132 B2
(45) Date of Patent: Apr. 17, 2018

(54) FINISHER BOX WITH BLADE ASSEMBLY

(71) Applicant: Axia Acquisition Corporation, Stone Mountain, GA (US)

(72) Inventors: Matthew W. Jungklaus, Lawrenceville, GA (US); Timothy Joseph Beran, Dacula, GA (US)

(73) Assignee: AXIA ACQUISITION CORPORATION, Stone Mountain, GA (US)

( * ) Notice: Subject to any disclaimer, the term of this patent is extended or adjusted under 35 U.S.C. 154(b) by 104 days.

(21) Appl. No.: 14/956,730

(22) Filed: Dec. 2, 2015

(65) Prior Publication Data

US 2016/0312479 A1 Oct. 27, 2016

Related U.S. Application Data

(60) Provisional application No. 62/152,767, filed on Apr. 24, 2015.

(51) Int. Cl.
*A46B 11/00* (2006.01)
*E04F 21/165* (2006.01)
*E04F 21/06* (2006.01)

(52) U.S. Cl.
CPC ............ *E04F 21/165* (2013.01); *E04F 21/06* (2013.01)

(58) Field of Classification Search
CPC ....... A46B 17/02; B05C 17/005; B05C 17/00; Y10T 156/179; E04F 21/02; E04F 21/165; E04F 21/08
USPC .................................................. 401/261, 48
See application file for complete search history.

(56) References Cited

U.S. PATENT DOCUMENTS

| | | | | |
|---|---|---|---|---|
| 2,824,442 A | * | 2/1958 | Ames | E04F 21/06 401/171 |
| 3,343,202 A | | 9/1967 | Ames | |
| 3,602,405 A | * | 8/1971 | Ames | E04F 21/06 222/386 |
| 3,888,611 A | * | 6/1975 | Ames | E04F 21/00 401/48 |
| 4,129,407 A | * | 12/1978 | Golls | E04F 21/241 15/235.8 |
| 4,132,517 A | * | 1/1979 | Ames | E04F 21/00 401/48 |

(Continued)

FOREIGN PATENT DOCUMENTS

WO 2015/196273 12/2015
WO 2016008637 1/2016

OTHER PUBLICATIONS

Search Report from the International Searching Authority for Application No. PCT/US16/14705 dated Jul. 21, 2016 (10 pages).

(Continued)

*Primary Examiner* — Jennifer C Chiang
(74) *Attorney, Agent, or Firm* — Michael Best & Friedrich LLP

(57) ABSTRACT

A finisher box includes a housing having a front end and a rear end. The housing includes a floor and a plurality of adjoining sides defining a cavity between them. The finisher box also includes a pressure plate pivotably coupled near the rear end of the housing about a pivot axis and a blade holder projecting from the front end of the housing in a direction perpendicular to the pivot axis. A blade slot for receiving a removable blade is defined by the blade holder and the housing.

40 Claims, 8 Drawing Sheets

(56) References Cited

U.S. PATENT DOCUMENTS

| | | | | |
|---|---|---|---|---|
| 4,516,868 A * | 5/1985 | Molnar | ............ | E04F 21/06 401/171 |
| 4,567,616 A | 2/1986 | Lyons | | |
| 5,069,610 A * | 12/1991 | Milburn | ............ | E04F 21/08 118/207 |
| 5,122,006 A * | 6/1992 | MacMillan | ............ | E04F 21/08 15/235.8 |
| 5,143,264 A * | 9/1992 | MacMillan | ............ | E04F 21/00 222/567 |
| 5,670,182 A * | 9/1997 | Mower | ............ | E04F 21/06 401/48 |
| 5,814,351 A * | 9/1998 | Mower | ............ | E04F 21/06 401/193 |
| 5,839,152 A * | 11/1998 | Kruskamp | ............ | A47L 13/022 15/235.4 |
| 5,882,691 A * | 3/1999 | Conboy | ............ | B05C 17/003 222/262 |
| 6,120,203 A * | 9/2000 | Modders | ............ | B05C 17/003 401/139 |
| 6,146,039 A * | 11/2000 | Pool | ............ | B05C 17/005 401/171 |
| 6,497,526 B2 * | 12/2002 | Weir | ............ | B05C 17/00516 401/195 |
| 6,595,764 B1 * | 7/2003 | Volk | ............ | E04F 21/00 15/235.3 |
| 6,733,262 B1 * | 5/2004 | Denkins | ............ | B05C 17/00516 15/235.7 |
| 6,874,965 B1 * | 4/2005 | Mondloch | ............ | E04F 21/08 15/235.3 |
| 6,877,923 B2 * | 4/2005 | Grayden | ............ | B43M 11/06 401/193 |
| 7,473,085 B2 * | 1/2009 | Schlecht | ............ | E04F 21/06 425/458 |
| 7,556,447 B2 * | 7/2009 | Bruggeman | ............ | A46B 11/0062 401/173 |
| 8,231,371 B1 * | 7/2012 | Jalbert | ............ | E04F 21/165 118/200 |
| 8,232,371 B2 * | 7/2012 | Cho | ............ | A61K 38/21 435/440 |
| 8,523,467 B2 * | 9/2013 | Murray | ............ | B05C 17/005 222/611.2 |
| 8,647,094 B1 | 2/2014 | Jalbert | | |
| 8,826,961 B2 * | 9/2014 | Castagnetta | ............ | B25G 3/38 156/574 |
| 9,283,586 B2 * | 3/2016 | MacMillan | ............ | B05C 17/01 |
| 9,464,447 B2 * | 10/2016 | Wilson | ............ | E04F 21/165 |
| 9,512,626 B1 * | 12/2016 | Murray | ............ | B05C 17/005 |
| 2001/0003563 A1 * | 6/2001 | Schauer | ............ | B05C 17/002 401/5 |
| 2005/0100386 A1 * | 5/2005 | Murray | ............ | B05C 17/005 401/5 |
| 2006/0171761 A1 * | 8/2006 | Castagnetta, Jr. | ... | E04F 21/1652 401/48 |
| 2006/0257573 A1 * | 11/2006 | Smythe | ............ | E04F 21/08 427/355 |
| 2007/0077114 A1 * | 4/2007 | Mondloch | ............ | E04F 21/08 401/48 |
| 2007/0259064 A1 * | 11/2007 | Mathews | ............ | E04F 21/06 425/87 |
| 2012/0132770 A1 * | 5/2012 | Gill | ............ | E04F 21/165 248/226.11 |
| 2013/0017337 A1 * | 1/2013 | Schlecht | ............ | E04F 21/165 427/427.3 |
| 2015/0233130 A1 * | 8/2015 | Wilson | ............ | E04F 21/165 16/426 |

OTHER PUBLICATIONS

Written Opinion from the International Searching Authority for Application No. PCT/US16/14705 dated Jul. 21, 2016 (7 pages).
Weaver, B. "Top Coat Success," TapeTech <http://www.tapetech.com/es/learning-center/articles/top-coat-success> dated Jun. 11, 2011 (2 pages).
International Search Report for Application No. PCT/US16/14705 dated Apr. 13, 2016 (11 pages).
International Written Opinion for Application No. PCT/US16/14705 dated Apr. 13, 2016 (7 pages).

* cited by examiner

FINISHER BOX WITH BLADE ASSEMBLY

CROSS-REFERENCE TO RELATED APPLICATIONS

This application claims priority to U.S. Provisional Application No. 62/152,767, filed on Apr. 24, 2015, the entire contents of which being incorporated herein by reference.

BACKGROUND

The present disclosure relates to an applicator box with an interchangeable blade assembly. One example of an applicator box is a finisher box, as described in greater detail below. However, applicator boxes can be applied in different scenarios and can be used with materials other than those for a finisher box.

Finisher boxes are used to apply drywall joint compound (or other materials) over wall seams or other joints to seal and finish them. Because these materials generally shrink when setting or drying, excess material (e.g., a crown) is often applied over depressed areas to compensate for the shrinkage in those areas, leaving the finished result flatter than it would be otherwise. Currently, these materials are pushed out of the finisher boxes and finished with a blade or screed. Blade assemblies of the finisher boxes have mechanisms built into them to add varying amounts of crown depending on how much the operator feels is needed. These mechanisms add complexity, cost, and weight to the box and require that the operator have some knowledge of how and when to adjust the crown.

Blades of the current blade assemblies are generally hardened SST or carbide. Blades of these materials are generally produced in a small cross section so they can have the flexibility required to produce crowns of various shapes and sizes. They are generally held in place by a blade holder that is machined from metal in such a way that it can securely hold the blade but is also flexible enough to be shaped into whatever crown is desired. Also, some mechanism for pushing or pulling on the center portion of the blade holder is typically built into the box to manipulate and shape the blade and control how much crown is desired at any given time.

SUMMARY

In one embodiment, an applicator box includes a housing having a front end and a rear end. The housing includes a floor and a plurality of adjoining sides defining a cavity between them. The finisher box also includes a pressure plate pivotably coupled near the rear end of the housing about a pivot axis and a blade holder projecting from the front end of the housing in a direction perpendicular to the pivot axis. A blade slot for receiving a removable blade is defined by the blade holder and the housing.

In another embodiment, an applicator box includes a housing having a front end and a rear end. The housing includes a plurality of adjoining sides defining a cavity between them. The finisher box also includes a pressure plate pivotably coupled to the housing and a blade holder near the front end of the housing. The blade holder includes a first end, a second end, a top wall, a bottom wall, and a front wall. The front wall extends from the top wall beyond the bottom wall of the blade holder. A blade slot for receiving a removable blade is defined by the front wall, the housing, and the bottom wall of the blade holder.

In yet another embodiment, an applicator box includes a housing having a front end and a rear end. The housing includes a floor and a plurality of adjoining sides defining a cavity between them. The floor has an aperture providing an opening to the cavity. The housing also has a blade slot recessed into the housing for receiving a removable blade. The applicator box also includes a pressure plate pivotably coupled to the housing and covering the cavity. The pressure plate enables the extrusion of material in the cavity through the aperture. The applicator box also includes at least one pinch point within the blade slot for frictionally engaging the removable blade.

In yet another embodiment, an applicator box includes a housing having a front end and a rear end. The housing includes a floor and a plurality of adjoining sides defining a cavity between them. The floor has an aperture providing an opening to the cavity. The applicator box also includes a pressure plate pivotably coupled to the housing and covering the cavity. The pressure plate enables the extrusion of material in the cavity through the aperture. The applicator box also includes a removable blade directly attached to the housing.

In yet another embodiment, an applicator box includes a housing having a front end and a rear end. The housing includes a floor and a plurality of adjoining sides defining a cavity between them. The floor has an aperture providing an opening to the cavity. The finisher box also includes a pressure plate pivotably coupled to the housing about a pivot axis near the rear end of the housing. The pressure plate enables the extrusion of material in the cavity through the aperture. The finisher box also includes a blade holder projecting from the front end of the housing and a blade slot for receiving a removable blade. The blade holder includes a front wall and a bottom wall perpendicular to the front wall. The front wall, the bottom wall, and the front end of the housing together define the blade slot. The finisher box also includes at least one pinch point between the front end of the housing and the front wall to frictionally engage the removable blade.

In yet another embodiment, a blade for an applicator box includes a first end, a second end opposite the first end, an upper edge, and a bottom edge opposite the upper edge. The bottom edge includes at least one curve. A height of the blade is defined between the upper edge and the bottom edge. The height of the blade at the first end and the height of the blade at the second end are equal. The height of the blade at the curve is less than the height of the blade at the first end.

In yet another embodiment, a blade for an applicator box includes a first end, a second end opposite the first end, and an upper edge having a first niche and a second niche. The first niche is adjacent the first end and the second niche is adjacent the second end. The blade also includes a bottom edge opposite the upper edge. A height of the blade is defined between the upper edge and the bottom edge. The height of the blade at the first end and the height of the blade at the second end are equal. The height of the blade at the first niche is less than the height of the blade at the first end. The height of the blade at the second niche is less than the height of the blade at the second end.

DETAILED DESCRIPTION

Figure 1:
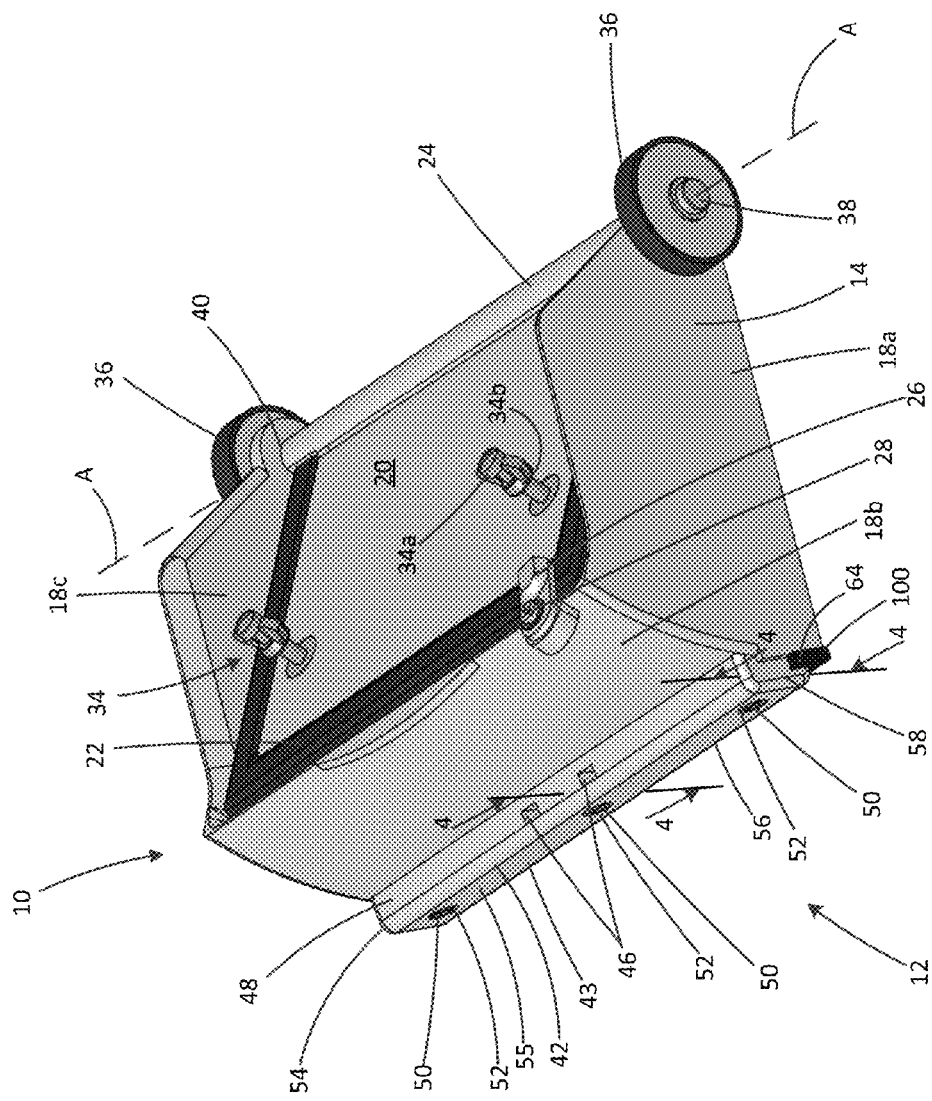
FIG. 1 illustrates a perspective view of a finisher box including a blade changing assembly.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

FIGS. 1-5 illustrate an applicator box or finisher box 10 including a blade changing assembly 12. The blade changing assembly 12 includes a blade holder 42 and a blade 100, described further hereafter. For the purposes of this application, the finisher box 10 is preferably for drywall finishing on a joint between pieces of drywall. Drywall finishing is described herein as an example application, but the applicator box may also be applied to other various types of joints or seams that need to be sealed or finished. Alternatively, the applicator box may apply material other than drywall compound to almost any surface, not limited to joints, such as fiber reinforced plastic sheeting or tiling. Furthermore, the applicator box may be used with a different shaped blade to leave an adhesive on wallboard so the operator can place fiber reinforced plastic sheet on the wall board (e.g., to waterproof bathroom walls).

The finisher box 10 also includes a shell or housing 14 with a floor 16 and spaced-apart sides 18a, 18b, 18c. The floor 16 defines a footprint of the housing 14 measured by the length and width of the floor 16. The floor 16 and the sides 18a-18c are adapted to receive joint compound in a cavity (not illustrated) they form. The floor 16 and sides 18a-18c may be formed as one piece, as illustrated in FIGS. 1-5, or coupled by any suitable means. A pressure plate 20 includes a first edge 22 and a spaced second edge 24 that may be parallel to the first edge 22. The pressure plate 20 is retained to and is pivotable within the housing 14 and between the sides 18a-18c about a pivot axis A. In particular, the first edge 22 is moveable along the side 18b in either direction along arrows X or Y, as shown in FIG. 3. The second edge 24 remains substantially in the same position, other than rotating about the pivot axis A, while the first edge 22 is moving along the side 18b. The pressure plate 20 is prevented from rotating beyond the side 18b by a stop 26. The stop 26 extends from the side 18b toward the second edge 24 of the pressure plate 20. The stop 26 is capable of being rotated about a fastener 28 so that the stop 26 may be rotated out of the way of the rotation of the pressure plate 20. This way, the pressure plate 20 may be rotated far enough to provide easy access to fill or clean the cavity of the finisher box 10. The finisher box 10 also includes an opening or aperture 30 located between adjacent edges or surfaces of the floor 16 and the side 18b. The majority of the aperture 30 may be formed in the floor 16. The aperture 30 allows joint compound or a seaming compound to be extruded therethrough from the cavity. As the pressure plate 20 is manually pivoted along the side 18b toward the floor 16, seaming compound, for example, is forced out through the aperture 30. In the illustrated embodiment, the aperture 30 is substantially the same length as the floor 16 and side 18b, although the aperture 30 in other embodiments may be any suitable length.

The finisher box 10 may be made from a plurality of different materials and constructed by a variety of methods. In the illustrated embodiment, the finisher box 10 may be molded from a plastic, such as polypropylene (PP), polyvinyl chloride (PVC), polyethylene (PE), among others, so as to be lightweight, to minimize areas on the finisher box 10 that are difficult to clean, and to include some non-stick properties so that joint compound does not easily stick in the cavity of the finisher box 10. In other embodiments, the finisher box 10 may be made from a metal.

The pressure plate 20 includes an internal conduit (not illustrated) at the second edge 24 of the pressure plate 20. The longitudinal axis of the conduit extends along the pivot axis A through the pressure plate 20, parallel to the first edge 22 and the second edge 24. The pressure plate 20 also includes two handle mounting studs 34 (i.e., stubs or screws 34a and wingnuts 34b). The screws 34a are sized and shaped to receive notches (not illustrated) of a handle assembly (not illustrated) that is capable of being mounted and unmounted to the finisher box 10 through tightening and loosening of the wingnuts 34b.

The finisher box 10 may also include wheels 36 coupled to the pressure plate 20 and the housing 14 by an axle 38. The axle 38 extends along the pivot axis A through the conduit and openings 40 of the side 18a and the side 18c. In other embodiments, the finisher box 10 may include a skid or skids (not illustrated) in place of one or both of the wheels 36.

Figure 2:
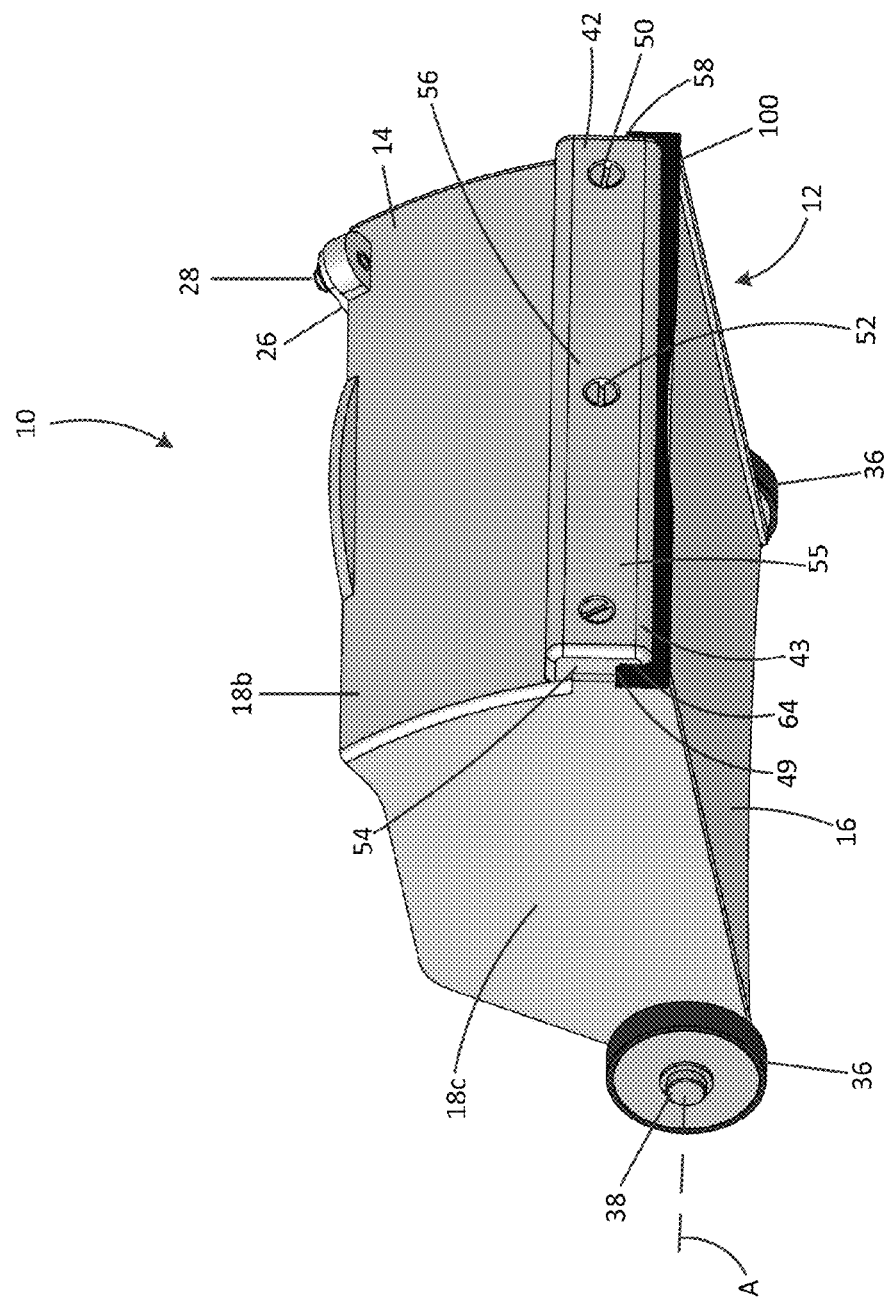
FIG. 2 illustrates another perspective view of the finisher box of FIG. 1.
Figure 3:
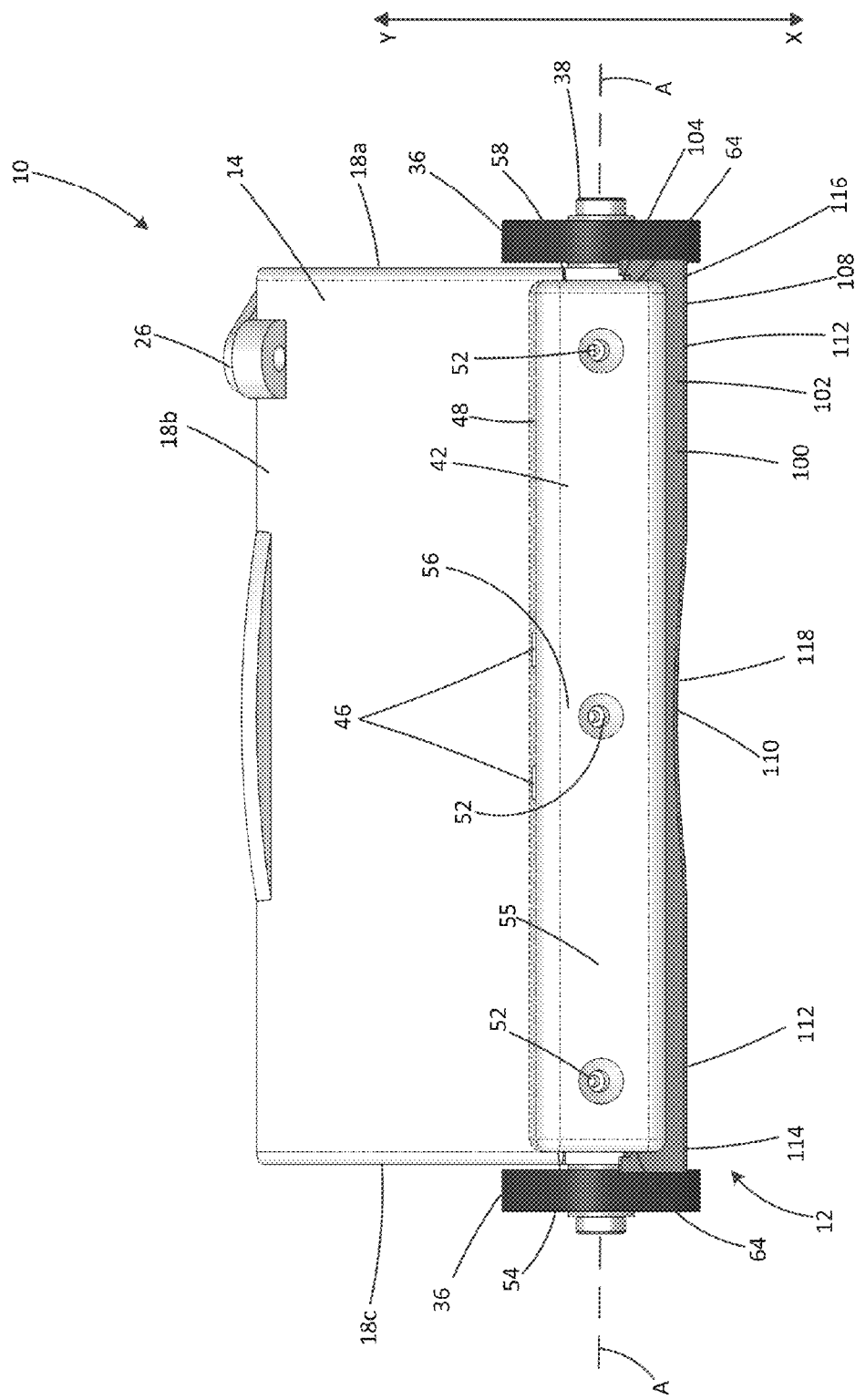
FIG. 3 illustrates a front view of the finisher box of FIG. 1.

FIGS. 1-5 illustrate the blade changing assembly 12 for the finisher box 10, including the blade holder 42 and the interchangeable blade 100. The blade holder 42 has a top wall 48, a bottom wall 49 opposing the top wall 48, a first end wall 54, an opposing second end wall 58, and a front wall 56. The front wall 56 includes a front face 55 and a rear face 57 which faces the side 18b. The blade holder 42 is coupleable to the side 18b of the housing 14 and projects from the housing 14, and in particular from side 18b in a direction perpendicular to pivot axis A, so that the blade holder 42 is outside the footprint of the floor 16. Blade holder 42 defines a blade slot 44 for the blade 100. The blade slot 44 is formed between a portion of the front wall 56 (namely, the overhang 43 as described subsequently), the side 18b of the housing 14, and the bottom wall 49, with the bottom of the blade slot 44 open for insertion of the removable blade 100. The blade holder 42 includes one or more cleaning slots 46 which extend from the top wall 48 of the blade holder 42 to the bottom wall 49 of the blade holder 42. The cleaning slots 46 extend into the blade slot 44 and provide easy access to clean the blade slot 44 without having to remove the blade holder 42 from the finisher box 10. As best shown in FIG. 2, the front wall 56 includes an overhang 43 that extends vertically (as shown in FIG. 2) beyond the bottom wall 49 of the blade holder 42, creating a staircase shape in cross section, with the overhang 43 as a "riser" and the bottom wall 49 as a "step." The overhang 43 projects laterally (as shown in FIG. 1) from the side 18b and extends from the first end wall 54 of the blade holder 42 to the second end wall 58 of the blade holder 42. In other embodiments, the overhang 43 may not extend the entire length of the blade holder 42. For example, the blade holder 42 may include multiple overhangs 43 positioned at the end walls 54, 58 of the blade holder 42 or multiple overhangs 43 positioned at the end walls 54, 58 and at the center of the blade holder 42.

Figure 8:
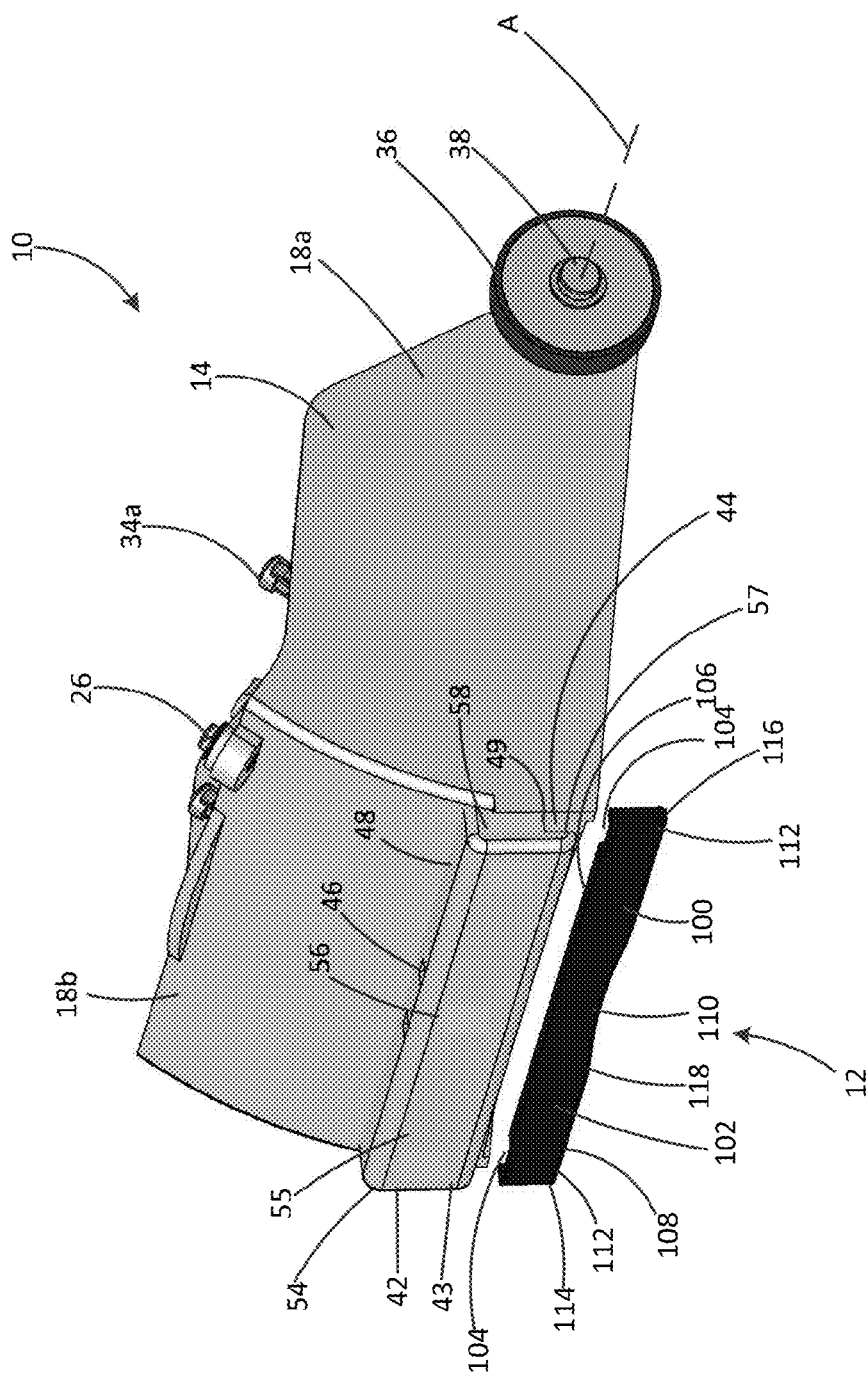
FIG. 8 illustrates a perspective view of a finisher box including a blade changing assembly according to a second embodiment of the invention.

The housing 14 also includes fastener openings (not illustrated) for coupling the blade holder 42 to the housing 14. In the illustrated embodiment, the blade holder 42 is coupled to the housing 14 through three fasteners 50. A first fastener 50 extends through a fastener opening 52 of the blade holder 42 at the first end wall 54 of the blade holder 42. A second fastener 50 extends through a fastener opening 52 of the blade holder 42 in the front wall 56 of the blade holder 42. Finally, a third fastener 50 extends through a fastener opening 52 of the blade holder 42 at a second end wall 58 of the blade holder 42. In other embodiments, any suitable number of fasteners 50 and fastener openings 52 may be used for the finisher box 10. In yet other embodiments, the blade holder 42 may be integrally formed as one piece with the housing 14 so the blade holder 42 and the housing 14 are all one-piece, as illustrated in FIG. 8.

Figure 4:
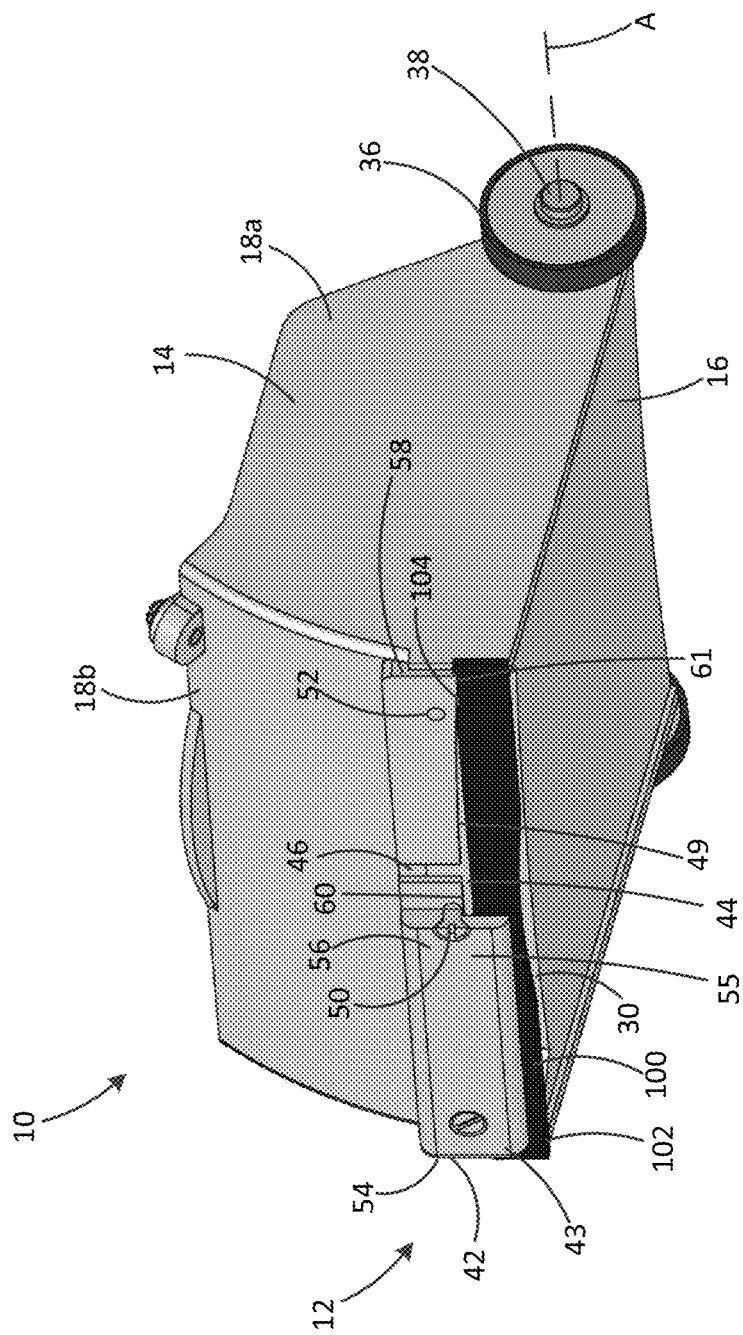
FIG. 4 illustrates a perspective view of the finisher box of FIG. 1 including a partial sectional view taken along lines 4-4 of FIG. 1.
Figure 5:
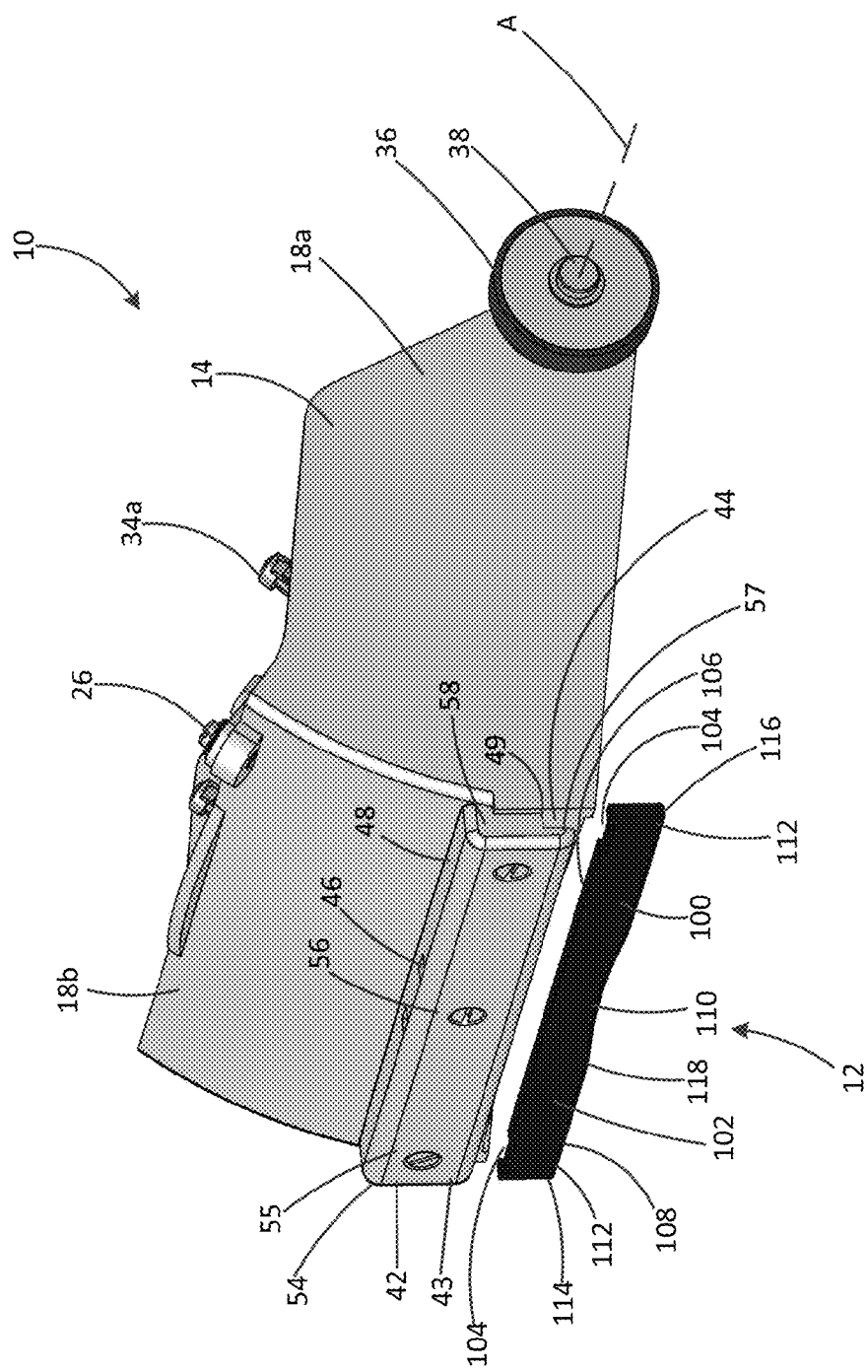
FIG. 5 illustrates another perspective view of the finisher box of FIG. 1 with a blade spaced apart from the finisher box.
Figure 6:
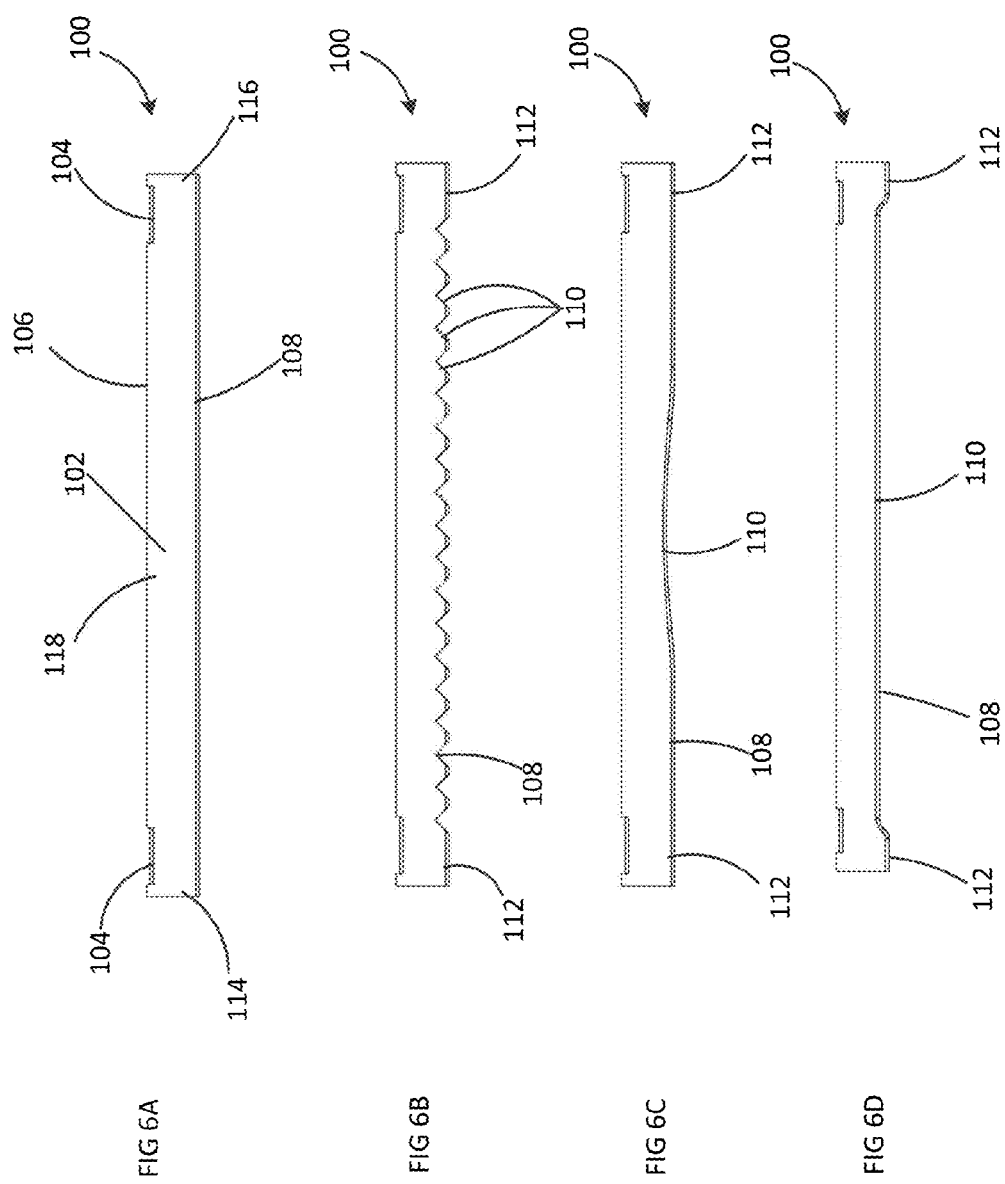
FIGS. 6A-6D illustrate a plurality of blades for the blade assembly of the finisher box of FIG. 1.

As shown in FIGS. 4 and 5, the blade slot 44 is defined between the overhang 43 of the blade holder 42 and the side 18*b* of the housing 14. The blade slot 44 extends from the side 18*a* to side 18*c* and is open below the first and the second end walls 54, 58 of the blade holder 42 (i.e., a blade 100 received in blade slot 44 may extend beyond the first and the second end walls 54, 58 of the blade holder 42). As shown in FIG. 4, the bottom wall 49 of the blade holder 42 may include a curved portion 60 to provide clearance between the blade 100 and the bottom wall 49 of the blade holder 42, allowing the blade 100 to bend or flex where the clearance permits in a direction perpendicular to pivot axis A (i.e., vertically as shown in FIG. 4). The curved portion 60 extends a substantial length of the blade holder 42, but as illustrated in the embodiment of FIG. 4, the curved portion 60 does not extend the entire length of the blade holder 42. There are non-curved portions 61 adjacent each of the first and second end walls 54, 58 of the blade holder 42 in the embodiment illustrated in FIG. 4. In other embodiments, the curved portion 60 may extend shorter or farther than the illustrated embodiment. In the illustrated embodiment, the curved portion 60 of the blade slot 44 is a uniform curved shape. However, in other embodiments, the curved portion 60 may be shaped and dimensioned in a non-uniform manner (e.g., flat or angled) to provide room for the blade 100 to bend at various places along its length. In yet other embodiments, the blade holder 42 does not include a curved portion 60 and the blade slot 44 is flat for its entire length, restricting the blade 100 from bending. In some embodiments, the blade holder 42 may be fully closed near one or both end walls 54, 58 (i.e., there may be additional portions extending from the overhang 43 to the side 18*b* near each end wall 54, 58 of the blade holder 42) to better capture the blade 100 within the blade slot 44.

FIGS. 6A-6D show a plurality of blades 100 for the finisher box 10. Blade design depends on the composition of the material to be expelled from the cavity in the housing 14, the surface upon which the material will be deposited, and the user's preferences, among other things. Thus, the blade holder's 42 ability to accommodate various blade shapes is helpful. Each blade 100 may include a blade body 102 with two niches 104 on a generally flat upper edge 106 of the blade 100. Some blades 100 (e.g., the blade 100 shown in FIG. 6A) may include a generally flat bottom edge 108, while other blades 100 (e.g., the blades 100 shown in FIGS. 6C and 6D) may include a substantially curved bottom edge 108 with a curve 110. A height of the blade 100 is defined between the upper edge 106 and the bottom edge 108. The blades 100 may include radiused or sharp (e.g., cornered) edges. The blades 100 are also preferably sufficiently thick in cross section to avoid breaking and quickly wearing down, but may have varying degrees of thickness. Other blades 100 may include a bottom edge 108 of varying degrees of curvature where the curve 110 may be along the bottom edge 108 at different places than those of the illustrated blades 100. Yet other blades 100 (e.g., the blade 100 shown in FIG. 6B) may include a plurality of curves 110. There are many other blades 100 and blade designs not illustrated herein that are capable of being used with the finisher box 10.

In one example, the blade 100 illustrated in FIGS. 1-5 includes flat portions 112 extending from each end 114, 116 of the blade 100 about ½ inch and the curve 110 in a middle section 118 of the blade 100. However, as stated above, that flat portion 112 may extend shorter or farther than ½ inch and the curve 110 may extend closer to or further from the upper edge 106 of the blade 100. The blades 100 may be easily mass produced in a variety of materials and in a variety of cross sections. However, preferably, the blades 100 are produced from a type of plastic so they may be easily mass produced and the blades 100 may be capable of including radiused edges, among other things. Furthermore, the blades 100 may be color coded to help identify which blade 100 to use at a particular time, or just for general identification purposes. The material and cross section of the blade 100 can be altered as needed. While a completely rigid blade 100 will work well in many situations, it is beneficial for the blade 100 to be just flexible enough to flex over imperfections on a wall or other application surfaces without having to lift the ends 114, 116 of the blade 100 off the wall. In some embodiments, the blade 100 is rigid enough to hold the intended shape, but is flexible enough so that the ends 114, 116 of the blade 100 will remain in contact with the wall while the middle section 118 flexes over any imperfections on the wall surface.

Figure 7:
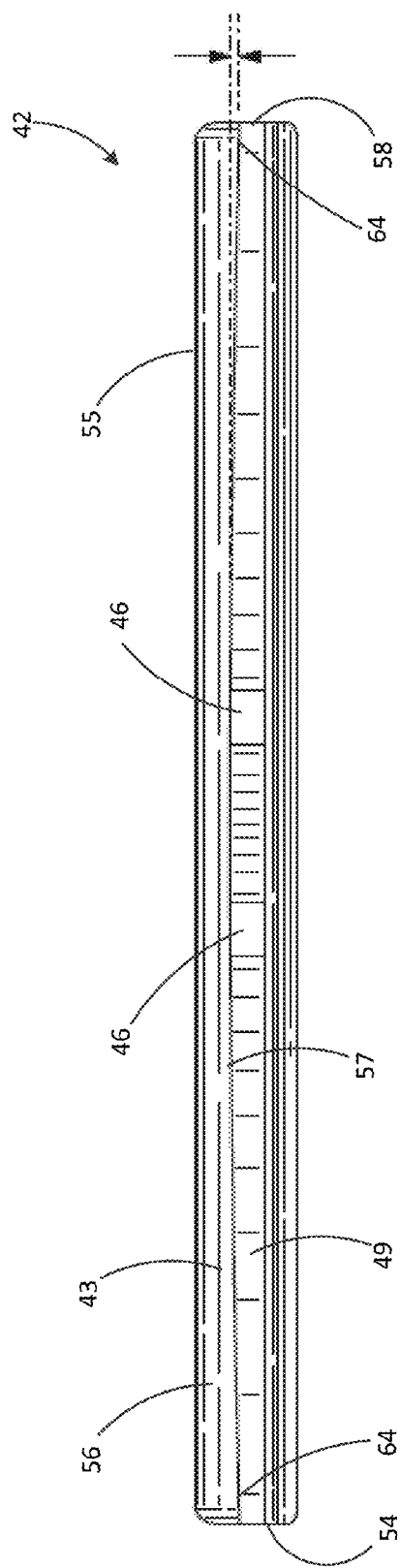
FIG. 7 illustrates a bottom view of a blade holder of the finisher box of FIG. 1.

When assembled with the blade holder 42, the blade 100 extends into the blade slot 44 where the blade 100 is retained by pinch points 64 (FIGS. 2, 3, and 7) between the overhang 43 of the blade holder 42 and the housing 14. The pinch points 64 are formed by reducing the distance between the overhang 43 and the side 18*b* of the housing 14 to create frictional engagement of the blade 100 within the blade slot 44. One pinch point 64 is near the first end wall 54 of the blade holder 42 and another pinch point 64 is near the second end wall 58 of the blade holder 42. As illustrated in FIG. 7, the rear face 57 of the front wall 56 is not parallel with the front face 55 of the front wall 56. In other words, the thickness of the overhang 43 is not uniform along the length of the overhang. The overhang 43 is shaped so that the ends of the front wall 56 are closer to the side 18*b* of the housing 14. Because the pinch points 64 are also near ends 114, 116 of the blade 100 and the blade holder 42, the blade 100 may flex upward where the blade slot 44 provides clearance until the blade 100 contacts the bottom wall 49 of the blade holder 42. The niches 104 of the blade 100 fit around the end walls 54, 58 of the blade holder 42 so that the blade 100 does not laterally slide within the blade slot 44, specifically in the directions parallel to pivot axis A. In the illustrated embodiment, the blades 100 extend slightly beyond the end walls 54, 58 of the blade holder 42.

In other embodiments, the side 18b of the housing may be curved and the overhang 43 may be shaped so that the rear face 57 and the front face 55 are parallel along the length of the overhang 43. In yet other embodiments, the side 18b may be shaped as described above (i.e., substantially flat) and the rear face 57 and the front face 55 may be parallel along the length of the overhang 43. In this embodiment, the blade 100 may be wider at the ends 114, 116 so the blade 100 itself is shaped to provide frictional engagement between the finisher box 10 and the blade 100. Alternatively, the blade 100 may have a uniform width along its length, but may be wide enough so that the blade 100 is frictionally engaged along the entire length of the blade slot 44. In other words, the blade slot 44 has one pinch point 64 that extends the entire length of the blade slot 44. The blade 100 may be coupled to the finisher box 10 in other functional fashions, such as by fastening the blade 100 to the finisher box 10 with Velcro, magnets, or fasteners.

FIG. 5 illustrates the blade 100 removed from the blade slot 44. The blade 100 is easily inserted into the blade slot 44 by placing the blade 100 along the side 18b and manually pushing gently on one end 114, 116 of the blade 100 and then pushing gently on the other end 114, 116 of the blade 100. By pushing the blade 100 into the blade slot 44, the pinch points 64 between the overhang 43 and the housing 14 hold the blade ends 114, 116 in place. Because the blades 100 extend beyond the end walls 54, 58 of the blade holder 42, the blade 100 is also easily removable and replaceable. The blade 100 is removable in a reverse action as that described above. The blade 100 is pushed gently on one end 114, 116 to exceed the holding force provided by the pinch point 64 so the blade 100 is at least partially removed from the blade slot 44. The operator can then grab the blade 100 and remove it completely by pulling the blade 100 from the blade slot 44. Or, the operator can push the other end 114, 116 of the blade 100 from the blade slot 44.

The ease of insertion and removal of one blade 100 allows the operator to switch between blades 100 very efficiently and very quickly. By being able to quickly switch between blades 100, the operator may be able to quickly switch between projects by changing to a blade 100 of a different shape. For example, if a different crown or shape is desired, the operator simply replaces the current blade 100 with another blade 100 that will give the operator the desired result. There is no need to include, in the finisher box 10, a complex mechanism for manipulating the blade's shape or conformation, and that saves cost and weight. The variability of the shapes of the blades 100 allows for the finisher box 10 to be used for a variety of different projects, as described above.

In operation, the blade 100 is inserted into the finisher box 10 before or after the cavity of the finisher box 10 is filled with mastic or a different seaming compound. After the finisher box 10 is filled, the finisher box 10 is placed against a joint on the application surface. Manual pressure is applied to the pressure plate 20 through the connected handle assembly, so that the pressure plate 20 is rotated about the pivot axis A and compound is extruded from the aperture 30. The blade 100 travels over the extruded mastic so that the extruded mastic takes on the general shape of the inserted blade 100 on the joint. In general, the blade 100 maintains its nominal shape and does not flex. Therefore, the compound applied to the joint will have generally the same shape that is manufactured into the blade 100 itself. However, sometimes the middle section 118 of the blade 100 (or another section depending on the selected blade 100) must travel over elevated areas on the application surface that are significantly higher than the rest of the application surface. In this case, the middle section 118 of the blade 100 is able to float over these elevated areas by flexing upward where the bottom wall 49 of the blade holder 42 provides clearance in the blade slot 44. When the operator completes application of compound to that particular area, the operator may easily remove the current blade 100 and insert a different blade 100 with a different shape or configuration. Or, the operator may remove the blade 100, exposing the blade slot 44 for easy cleaning of the blade slot 44.

What is claimed is:

1. An applicator box comprising:
   a housing including a floor and a plurality of adjoining sides defining a cavity between them, the plurality of adjoining sides including a front side;
   a pressure plate pivotably coupled to the housing about a pivot axis; and
   a blade holder fixed relative to the housing and projecting from the front side of the housing in a direction perpendicular to the pivot axis,
   wherein a blade slot for receiving a removable blade is defined by the blade holder and the housing.

2. The applicator box according to claim 1, wherein the blade slot holds the removable blade therein by frictional engagement between the blade holder and the housing.

3. The applicator box according to claim 1, wherein the blade holder includes a first end, a second end, a top wall, and a bottom wall.

4. The applicator box according to claim 3, wherein the bottom wall is shaped so that a distance between the top wall and the bottom wall varies along a length of the bottom wall.

5. The applicator box according to claim 1, wherein the blade holder includes an overhang bordering the blade slot, the overhang having at least one pinch point where the housing is closer to the overhang than elsewhere along the blade slot.

6. The applicator box according to claim 1, wherein the blade holder includes an overhang bordering the blade slot, wherein the overhang has a first pinch point near a first end of the overhang and a second pinch point near a second end of the overhang, wherein the housing is closer to the overhang at the pinch points than elsewhere along the blade slot.

7. The applicator box according to claim 1, further comprising a removable blade received within the blade slot, and wherein the removable blade includes two niches spaced to engage opposing ends of the blade holder.

8. The applicator box according to claim 7, wherein the removable blade includes a first edge and a second edge, and wherein the removable blade includes at least one niche on the first edge, and a curve on the second edge.

9. The applicator box according to claim 1, wherein the blade holder includes at least one cleaning slot that extends through the blade holder from the top wall to the bottom wall, leading to the blade slot.

10. The applicator box according to claim 1, wherein the floor of the housing defines a footprint, and wherein the blade holder projects from the housing so that the blade holder is outside the footprint.

11. An applicator box comprising:
    a housing including a floor and a plurality of adjoining sides defining a cavity between them, the plurality of adjoining sides including a front side;
    a pressure plate pivotably coupled to the housing; and
    a blade holder near the front side of the housing, the blade holder including a top wall, a bottom wall, and a front wall, wherein the front wall extends from the top wall in a first direction, and wherein the front wall includes an overhang that extends beyond the bottom wall of the blade holder in the first direction,
wherein a blade slot for receiving a removable blade is defined by the front side of the housing, the overhang of the blade holder, and the bottom wall of the blade holder.

12. The applicator box according to claim 11, wherein the blade slot holds the removable blade therein by frictional engagement between the front wall and the housing.

13. The applicator box according to claim 11, and at least one pinch point between the front side of the housing and the overhang to frictionally engage the removable blade within the blade slot.

14. The applicator box according to claim 13, wherein the at least one pinch point results from the front side of the housing being closer to the overhang than elsewhere along the blade slot.

15. The applicator box according to claim 11, wherein the front wall has a first pinch point near a first end of the front wall and a second pinch point near a second end of the front wall, wherein the housing is closer to the front wall at the pinch points than elsewhere along the blade slot.

16. The applicator box according to claim 11, wherein a distance between the top wall and the bottom wall varies along a length of the bottom wall, and wherein a distance between the top wall and the bottom wall at the center of the blade holder is smaller than a distance between the top wall and the bottom wall at either a first end or a second end of the blade holder.

17. The applicator box according to claim 11, wherein the pressure plate pivots about a pivot axis near the rear end of the housing, and wherein the blade holder projects from the front side of the housing in a direction perpendicular to the pivot axis.

18. The applicator box according to claim 11, wherein the blade holder includes a staircase shape in cross section.

19. An applicator box comprising:
a housing including a floor and a plurality of adjoining sides defining a cavity between them, wherein the plurality of adjoining sides includes a front side, wherein the floor has an aperture providing an opening to the cavity;
a blade holder near the front side of the housing, the blade holder including a top wall, a bottom wall, and a front wall;
a pressure plate pivotably coupled to the housing and covering the cavity, the pressure plate enabling the extrusion of material in the cavity through the aperture; and
at least one pinch point within a blade slot defined between the front wall and the front side of the housing, wherein the at least one pinch point is for frictionally engaging a removable blade, and wherein the front side of the housing is closer to the front wall at the at least one pinch point than elsewhere along the blade slot.

20. The applicator box according to claim 19 and a removable blade engageable within the blade slot, the removable blade comprising an upper edge and a bottom edge, and wherein, the bottom edge projects beyond the floor of the housing, when the blade is engaged by the at least one pinch point in the blade slot.

21. An applicator box comprising:
a housing including a floor and a plurality of adjoining sides defining a cavity between them, wherein the plurality of adjoining sides includes a front side, wherein the floor has an aperture providing an opening to the cavity;
a blade holder near the front side of the housing, the blade holder including a top wall, a bottom wall, and a front wall;
a pressure plate pivotably coupled to the housing and covering the cavity, the pressure plate enabling the extrusion of material in the cavity through the aperture; and
a removable blade directly attached to the housing such that a first side of the blade is directly contacting the front side.

22. The applicator box according to claim 21, wherein the housing has a blade slot, wherein the blade slot includes a first end and a second end, wherein the removable blade is positioned in the blade slot, and wherein the removable blade is directly attached to the housing at each of the first end and the second end of the blade slot.

23. The applicator box according to claim 21, wherein the housing has a blade slot including a first end and a second end, wherein the removable blade is positioned in the blade slot, and wherein the removable blade includes a non-uniform thickness sufficient to frictionally engage the blade at each of the first end and the second end of the blade slot.

24. The applicator box according to claim 21, wherein the housing has a blade slot including a first end and a second end, wherein the removable blade is positioned in the blade slot, and wherein the removable blade has an upper edge and a lower edge, the upper edge including a first niche adjacent the first end and a second niche adjacent the second end, wherein the first niche and the second niche are configured to prevent movement of the blade in at least one direction with respect to the housing.

25. The applicator box according to claim 21, wherein the housing has a blade slot including a first end and a second end, wherein the removable blade is positioned in the blade slot, and wherein the blade slot is sufficiently large to allow the removable blade to flex within the blade slot, wherein the clearance is between the first end and the second end of the blade slot.

26. An applicator box comprising:
a housing including a floor and a plurality of adjoining sides defining a cavity between them, wherein the plurality of adjoining sides includes a front side, wherein the floor has an aperture providing an opening to the cavity;
a pressure plate pivotably coupled to the housing about a pivot axis, the pressure plate enabling the extrusion of material in the cavity through the aperture;
a blade holder projecting from the front side of the housing, wherein the blade holder includes a top wall, a bottom wall, and a front wall, wherein the front wall extends from the top wall in a first direction, and wherein the front wall includes an overhang that extends beyond the bottom wall of the blade holder in the first direction;
a blade slot for receiving a removable blade,
wherein the front wall, the bottom wall, and the front side of the housing together define the blade slot; and
at least one pinch point between the front side of the housing and the overhang to frictionally engage the removable blade within the blade slot, and wherein the front side of the housing is closer to the front wall at the at least one pinch point than elsewhere along the blade slot.

27. The applicator box according to claim 26, wherein the distance between the top wall and the bottom wall of the blade holder varies along their longitudinal dimensions.

28. The applicator box according to claim 26 and a removable blade engageable within the blade slot, the removable blade including at least one niche for engagement within the blade holder.

29. A blade for an applicator box, the blade comprising:
a first end;
a second end opposite the first end;
an upper edge; and
a bottom edge opposite the upper edge, wherein the bottom edge includes at least one curve;
wherein a height of the blade is defined between the upper edge and the bottom edge,
wherein the height of the blade at the first end and the height of the blade at the second end are equal, and
wherein the height of the blade at the curve is less than the height of the blade at the first end.

30. The blade according to claim 29, wherein the upper edge has a first niche adjacent the first end, and wherein the upper edge has a second niche adjacent the second end.

31. The blade according to claim 29, wherein the bottom edge includes a plurality of curves.

32. The blade according to claim 29, wherein the blade has a non-uniform thickness sufficient to frictionally engage the blade within the applicator box.

33. A blade for an applicator box, the blade comprising:
a first end;
a second end opposite the first end;
an upper edge including a first niche and a second niche, wherein the first niche is adjacent the first end, and wherein the second niche is adjacent the second end; and
a bottom edge opposite the upper edge,
wherein a height of the blade is defined between the upper edge and the bottom edge,
wherein the height of the blade at the first end and the height of the blade at the second end are equal,
wherein the height of the blade at the first niche is less than the height of the blade at the first end, and
wherein the height of the blade at the second niche is less than the height of the blade at the second end.

34. The blade according to claim 33, wherein the bottom edge is substantially flat.

35. The blade according to claim 34, wherein the upper edge is substantially parallel to the bottom edge except at the first niche and the second niche.

36. The blade according to claim 33, wherein the blade has a non-uniform thickness sufficient to frictionally engage the blade within the applicator box.

37. The applicator box according to claim 19, wherein the front wall extends from the top wall to the bottom wall in a first direction, and wherein the front wall includes an overhang that extends beyond the bottom wall of the blade holder in the first direction.

38. The applicator box according to claim 19, wherein the housing is formed as one piece.

39. The applicator box according to claim 21, wherein the front wall extends from the top wall to the bottom wall in a first direction, and wherein the front wall includes an overhang that extends beyond the bottom wall of the blade holder in the first direction.

40. The applicator box according to claim 21, wherein the removable blade is directly attached to the housing such that a second side of the blade is directly contacting the front wall of the blade holder, and wherein the first side of the blade is opposite the second side of the blade.

* * * * *